US012588513B2

(12) United States Patent
Tsai et al.

(10) Patent No.: US 12,588,513 B2
(45) Date of Patent: Mar. 24, 2026

(54) PHYSICAL UNCLONABLE FUNCTION GENERATOR STRUCTURE AND OPERATION METHOD THEREOF

(71) Applicant: Powerchip Semiconductor Manufacturing Corporation, Hsinchu (TW)

(72) Inventors: Bo-An Tsai, Hsinchu City (TW); Shyng-Yeuan Che, Hsinchu County (TW); Shih-Ping Lee, Hsinchu City (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 667 days.

(21) Appl. No.: 17/978,968

(22) Filed: Nov. 2, 2022

(65) Prior Publication Data

US 2024/0113041 A1      Apr. 4, 2024

(30) Foreign Application Priority Data

Oct. 3, 2022      (TW) ................................. 111137487

(51) Int. Cl.
*H01L 23/00*          (2006.01)
*G06F 21/79*          (2013.01)
(52) U.S. Cl.
CPC ............ *H01L 23/576* (2013.01); *G06F 21/79* (2013.01)
(58) Field of Classification Search
CPC .................................................... H01L 23/576
USPC ........................................................ 257/299
See application file for complete search history.

(56) References Cited

U.S. PATENT DOCUMENTS

| | | | |
|---|---|---|---|
| 7,441,709 B2 | 10/2008 | Chan et al. | |
| 9,666,582 B1 | 5/2017 | Li et al. | |
| 10,032,521 B2 | 7/2018 | Grigoriev et al. | |
| 10,176,127 B2 | 1/2019 | Watanabe | |
| 10,833,027 B2 | 11/2020 | Lisart et al. | |
| 2003/0062563 A1* | 4/2003 | Okita ..................... | H10B 53/00 257/303 |
| 2009/0039462 A1 | 2/2009 | Huang | |

(Continued)

FOREIGN PATENT DOCUMENTS

TW          202211436          3/2022

OTHER PUBLICATIONS

"Office Action of Taiwan Counterpart Application", issued on Jun. 20, 2023, p. 1-p. 9.

(Continued)

*Primary Examiner* — Ajay Arora
(74) *Attorney, Agent, or Firm* — JCIPRNET

(57) ABSTRACT

A physical unclonable function (PUF) generator structure including a substrate and a PUF generator is provided. The PUF generator includes a first electrode layer, a second electrode layer, a first dielectric layer, a first contact, a second contact, and a third contact. The first electrode layer is disposed on the substrate. The second electrode layer is disposed on the first electrode layer. The first dielectric layer is disposed between the first electrode layer and the second electrode layer. The first contact and the second contact are electrically connected to the first electrode layer and are separated from each other. The third contact is electrically connected to the second electrode layer.

19 Claims, 5 Drawing Sheets

(56) References Cited

U.S. PATENT DOCUMENTS

| | | | | |
|---|---|---|---|---|
| 2016/0065379 A1* | 3/2016 | Holcomb | ................ | G09C 1/00 |
| | | | | 713/189 |
| 2021/0175185 A1* | 6/2021 | Kozicki | ............... | H04L 9/0866 |
| 2022/0068878 A1* | 3/2022 | Ma | ........................ | H10B 43/00 |

OTHER PUBLICATIONS

Yosef Raskin et al., "Top electrode patterning and reliability performance of MIM capacitors" , Towerjazz Technical Journal , vol. 1, Apr. 2011, pp. 1-5.
Meng-Yi Wu et al., "A PUF Scheme Using Competing Oxide Rupture with Bit Error Rate Approaching Zero" , 2018 IEEE International Solid—State Circuits Conference—(ISSCC), Feb. 2018, pp. 1-3.
Woo-Young Jeong et al., "Design of eFuse OTP Memory with Wide Operating Voltage Range for PMICs" , Journal of the Korea Institute of Information and Communication Engineering, vol. 18, Issue 1, Jan. 2014, with English abstract, pp. 115-122.
Yongxu Ren et al., "Design of a Logic eFuse OTP Memory IP", Journal of the Korea Institute of Information and Communication Engineering, vol. 20, Issue 2, Feb. 2016, with English abstract, pp. 317~326.

* cited by examiner

P1     P2

106

PHYSICAL UNCLONABLE FUNCTION GENERATOR STRUCTURE AND OPERATION METHOD THEREOF

CROSS-REFERENCE TO RELATED APPLICATION

This application claims the priority benefit of Taiwan application serial no. 111137487, filed on Oct. 3, 2022. The entirety of the above-mentioned patent application is hereby incorporated by reference herein and made a part of this specification.

BACKGROUND

Technical Field

The invention relates to a semiconductor device, and particularly relates to a physical unclonable function (PUF) generator structure.

Description of Related Art

Currently, the physical unclonable function (PUF) technology is widely used in security product applications. The PUF technology is a technique that can be used to create a unique random key for a physical entity (e.g., integrated circuit). In general, the PUF generator utilizes the manufacturing variation of the semiconductor process to obtain a unique random code. Even with a precise process step, a semiconductor chip can be fabricated, but the above random code is almost impossible to be copied, so the PUF technology has high security. However, how to reduce the size of the PUF generator is the goal of continuous efforts at present.

SUMMARY

The invention provides a physical unclonable function (PUF) generator structure, which can effectively reduce the size of the PUF generator.

The invention provides an operation method of a PUF generator structure, which can generate a random code in a simple manner.

The invention proposes a PUF generator structure, which includes a substrate and a PUF generator. The PUF generator includes a first electrode layer, a second electrode layer, a first dielectric layer, a first contact, a second contact, and a third contact. The first electrode layer is disposed on the substrate. The second electrode layer is disposed on the first electrode layer. The first dielectric layer is disposed between the first electrode layer and the second electrode layer. The first contact and the second contact are electrically connected to the first electrode layer and are separated from each other. The third contact is electrically connected to the second electrode layer.

According to an embodiment of the invention, in the PUF generator structure, the first contact and the second contact may be located on the same side of the first dielectric layer. The first contact and the third contact may be located on different sides of the first dielectric layer. The second contact and the third contact may be located on different sides of the first dielectric layer.

According to an embodiment of the invention, in the PUF generator structure, the first contact, the second contact, and the third contact may be located on the same side of the first dielectric layer.

According to an embodiment of the invention, in the PUF generator structure, the first dielectric layer may have a plurality of thicknesses.

According to an embodiment of the invention, in the PUF generator structure, the first dielectric layer may include a center portion and an edge portion. The edge portion is located on two sides of the center portion. The thickness of the edge portion may be less than the thickness of the center portion.

According to an embodiment of the invention, in the PUF generator structure, the top-view pattern of the edge portion may surround the top-view pattern of the center portion.

According to an embodiment of the invention, in the PUF generator structure, the top-view pattern of the edge portion may overlap the top-view pattern of the first contact and the top-view pattern of the second contact.

According to an embodiment of the invention, in the PUF generator structure, the first contact may pass through the edge portion to be electrically connected to the first electrode layer. The second contact may pass through the edge portion to be electrically connected to the first electrode layer.

According to an embodiment of the invention, in the PUF generator structure, the first contact and the second contact may be directly connected to the first electrode layer. The third contact may be directly connected to the second electrode layer.

According to an embodiment of the invention, the PUF generator structure may further include a second dielectric layer and a third dielectric layer. The second dielectric layer is disposed between the first electrode layer and the substrate. The third dielectric layer is disposed on the first electrode layer, the second electrode layer, the first dielectric layer, and the second dielectric layer.

According to an embodiment of the invention, in the PUF generator structure, the first contact and the second contact may be disposed in the second dielectric layer. The third contact may be disposed in the third dielectric layer.

According to an embodiment of the invention, in the PUF generator structure, the first contact, the second contact, and the third contact may be disposed in the third dielectric layer.

According to an embodiment of the invention, in the PUF generator structure, in the cross-sectional view, the first contact and the second contact may be symmetrically disposed on the first electrode layer.

According to an embodiment of the invention, the PUF generator structure may include a PUF generator array. The PUF generator array may include a plurality of the PUF generators, a first bit line, a second bit line, a word line, a first transistor, and a second transistor. The plurality of the PUF generators are arranged in an array. The first bit line is electrically connected to a plurality of the first contacts. The second bit line is electrically connected to a plurality of the second contacts. The word line is electrically connected to a plurality of the third contacts. The first transistor is electrically connected between the first contact and the first bit line. The second transistor is electrically connected between the second contact and the second bit line.

According to an embodiment of the invention, in the PUF generator structure, the plurality of the PUF generators may be arranged in a first direction and a second direction. The first direction may intersect the second direction.

According to an embodiment of the invention, in the PUF generator structure, the PUF generator array may include a plurality of the first transistors, and two adjacent first transistors located between two adjacent PUF generators may share the same first bit line.

According to an embodiment of the invention, in the PUF generator structure, the PUF generator array may include a plurality of the second transistors, and two adjacent second transistors located between two adjacent PUF generators may share the same second bit line.

The invention provides an operation method of the PUF generator structure, which includes performing an enrollment operation on the PUF generator. The enrollment operation may include the following steps. A first voltage is applied to the first contact, a second voltage is applied to the second contact, and a third voltage is applied to the third contact. The first voltage is equal to the second voltage, and the third voltage is greater than the first voltage and the second voltage.

According to an embodiment of the invention, the operation method of the PUF generator structure may further include performing an extraction operation on the PUF generator to read the data enrolled in the PUF generator. The extraction operation may include the following steps. A fourth voltage is applied to the first contact, a fifth voltage is applied to the second contact, and a sixth voltage is applied to the third contact. The fourth voltage is equal to the fifth voltage, and the sixth voltage is greater than the fourth voltage and the fifth voltage.

According to an embodiment of the invention, in the operation method of the PUF generator structure, the sixth voltage may be less than the third voltage.

Based on the above description, in the PUF generator structure according to the invention, the PUF generator includes the first electrode layer, the second electrode layer, the first dielectric layer, the first contact, the second contact, and the third contact. The first dielectric layer is disposed between the first electrode layer and the second electrode layer. The first contact and the second contact are electrically connected to the first electrode layer, and the third contact is electrically connected to the second electrode layer. The first contact, the second contact, and the third contact can be used as three terminals of the PUF generator. Therefore, the PUF generator can have a smaller size, and the process of the PUF generator can be integrated with the process of the capacitor.

In addition, in the operation method of the PUF generator structure according to the invention, the enrollment operation may include the following steps. The first voltage is applied to the first contact, the second voltage is applied to the second contact, and the third voltage is applied to the third contact. The first voltage is equal to the second voltage, and the third voltage is greater than the first voltage and the second voltage. By the above enrollment operation, the dielectric breakdown can be generated at the random position of the first dielectric layer to generate a random code. Therefore, the operation method of the PUF generator structure according to the invention can generate a random code in a simple manner.

In order to make the aforementioned and other objects, features and advantages of the invention comprehensible, several exemplary embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The embodiments are described in detail below with reference to the accompanying drawings, but the embodiments are not intended to limit the scope of the invention. For the sake of easy understanding, the same components in the following description will be denoted by the same reference symbols. In addition, the drawings are for illustrative purposes only and are not drawn to the original dimensions. Furthermore, the features in the top view and the features in the cross-sectional view are not drawn to the same scale. In fact, the dimensions of the various features may be arbitrarily increased or reduced for clarity of discussion.

Figure 1:
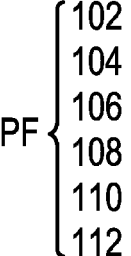
FIG. 1 is a cross-sectional view illustrating a physical unclonable function (PUF) generator structure according to some embodiments of the invention.
Figure 1:
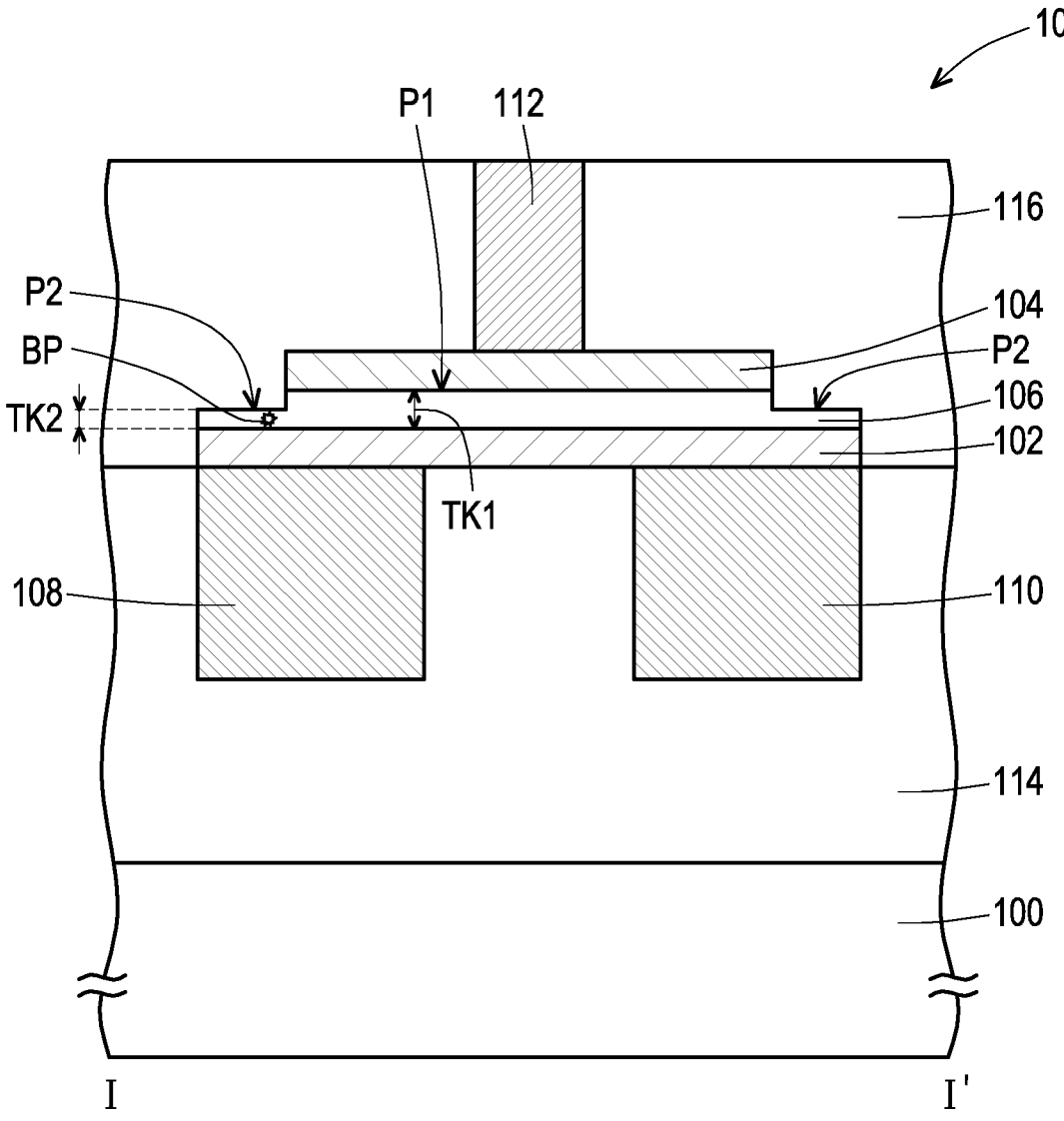
Figure 2:
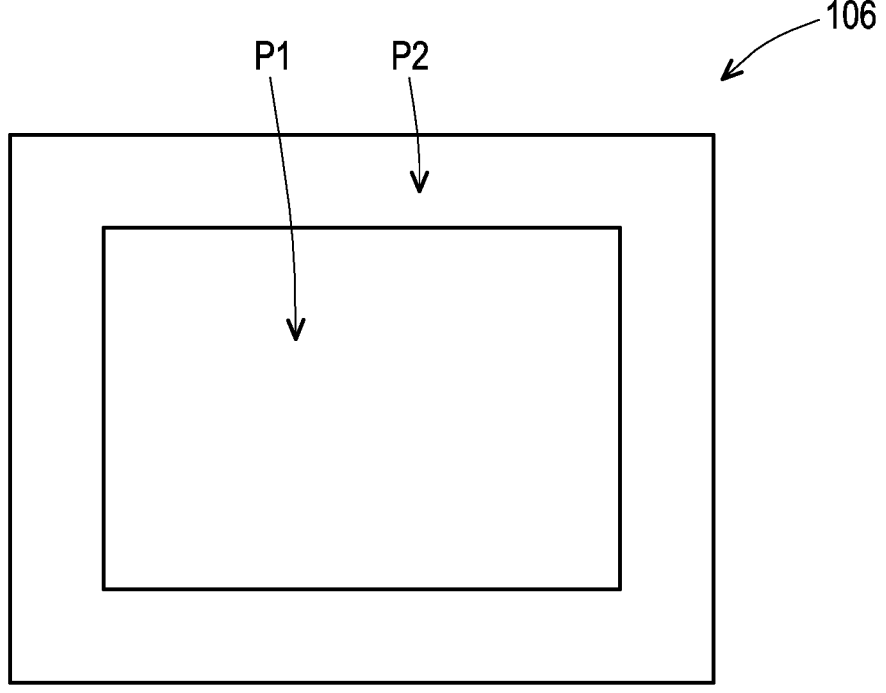
FIG. 2 is a top view of the dielectric layer in FIG. 1.
Figure 3:
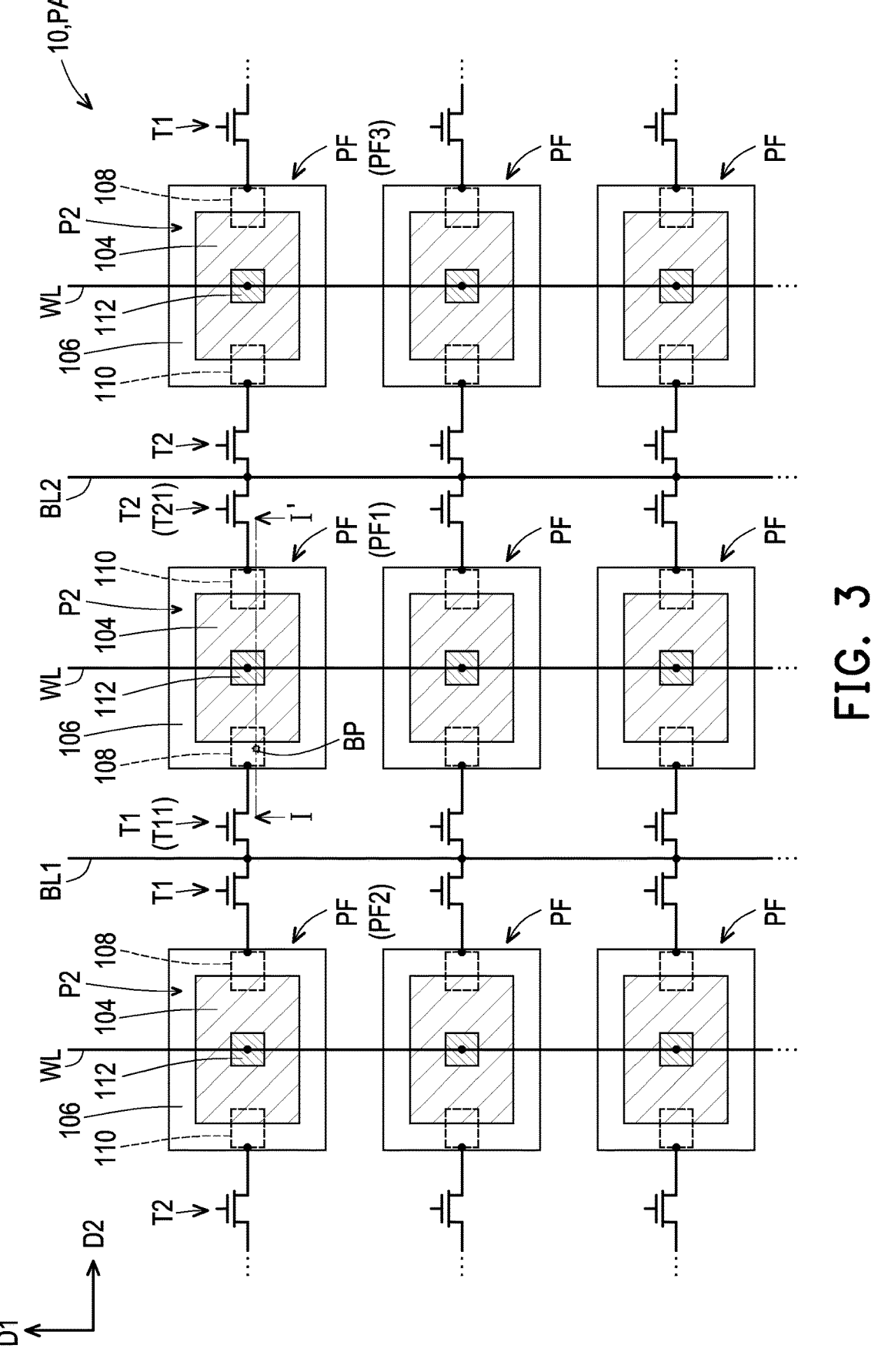
FIG. 3 is a schematic view illustrating a PUF generator array according to some embodiments of the invention.

FIG. 1 is a cross-sectional view illustrating a physical unclonable function (PUF) generator structure according to some embodiments of the invention. FIG. 2 is a top view of the dielectric layer in FIG. 1. FIG. 3 is a schematic view illustrating a PUF generator array according to some embodiments of the invention. In FIG. 3, the PUF generator is shown by the top view. FIG. 1 is a cross-sectional view taken along section line I-I' in FIG. 3. In the top view of the present embodiment, some components in the cross-sectional view are omitted to clearly illustrate the configuration relationship between the components in the top view. In the cross-sectional view of the present embodiment, some components in the top view are omitted to clearly illustrate the configuration relationship between the components in the cross-sectional view.

Referring to FIG. 1, a physical unclonable function (PUF) generator structure 10 includes a substrate 100 and a PUF generator PF. The substrate 100 may be a semiconductor substrate such as a silicon substrate. In addition, although not shown in the figure, the substrate 100 may have required components thereon, such as semiconductor devices (e.g., active devices and/or passive devices), and the description thereof is omitted here.

The PUF generator PF includes an electrode layer 102, an electrode layer 104, a dielectric layer 106, a contact 108, a contact 110, and a contact 112. The electrode layer 102 is disposed on the substrate 100. The material of the electrode layer 102 is, for example, tantalum (Ta), tantalum nitride (TaN), titanium (Ti), titanium nitride (TiN), or a combination thereof. The electrode layer 104 is disposed on the electrode layer 102. The material of the electrode layer 104 is, for example, tantalum, tantalum nitride, titanium, titanium nitride, or a combination thereof.

The dielectric layer 106 is disposed between the electrode layer 102 and the electrode layer 104. The dielectric layer 106 may have a plurality of thicknesses or a single thickness. In the present embodiment, the dielectric layer 106 has, for example, a plurality of thicknesses, but the invention is not limited thereto. For example, the dielectric layer 106 may include a center portion P1 and an edge portion P2. The edge portion P2 is located on two sides of the center portion P1.

The thickness TK2 of the edge portion P2 may be less than the thickness TK1 of the center portion P1. In some embodiments, as shown in FIG. 2, the top-view pattern of the edge portion P2 may surround the top-view pattern of the center portion P1. The material of the dielectric layer 106 is, for example, silicon nitride, silicon oxide, a high dielectric constant (high-k) material, or a combination thereof.

The contact 108 and the contact 110 are electrically connected to the electrode layer 102 and are separated from each other. In some embodiments, the contact 108 and the contact 110 may be directly connected to the electrode layer 102. In some embodiments, the contact 108 and the contact 110 may be located on the same side of the dielectric layer 106. In some embodiments, in the cross-sectional view, the contact 108 and the contact 110 may be symmetrically disposed on the electrode layer 102. In some embodiments, as shown in FIG. 3, the top-view pattern of the edge portion P2 may overlap the top-view pattern of the contact 108 and the top-view pattern of the contact 110. The contact 108 may be a single-layer structure or a multilayer structure. The material of the contact 108 is, for example, copper, aluminum, tungsten, tantalum, tantalum nitride, titanium, titanium nitride, or a combination thereof. The contact 110 may be a single-layer structure or a multilayer structure. The material of the contact 110 is, for example, copper, aluminum, tungsten, tantalum, tantalum nitride, titanium, titanium nitride, or a combination thereof.

The contact 112 is electrically connected to the electrode layer 104. In some embodiments, the contact 112 may be directly connected to the electrode layer 104. In some embodiments, the contact 108 and the contact 112 may be located on different sides of the dielectric layer 106. In some embodiments, the contact 110 and the contact 112 may be located on different sides of the dielectric layer 106. The contact 112 may be a single-layer structure or a multilayer structure. The material of the contact 112 is, for example, copper, aluminum, tungsten, tantalum, tantalum nitride, titanium, titanium nitride, or a combination thereof.

The PUF generator structure 10 may further include a dielectric layer 114 and a dielectric layer 116. The dielectric layer 114 is disposed between the electrode layer 102 and the substrate 100. In some embodiments, the contact 108 and the contact 110 may be disposed in the dielectric layer 114. The dielectric layer 114 may be a single-layer structure or a multilayer structure. The material of the dielectric layer 114 is, for example, silicon oxide, silicon nitride, silicon carbonitride (SiCN), silicon oxynitride (SiON), a low dielectric constant (low-k) material, or a combination thereof. In addition, although not shown in the figure, the dielectric layer 114 may have required components therein, such as interconnect structures, and the description thereof is omitted here.

The dielectric layer 116 is disposed on the electrode layer 102, the electrode layer 104, the dielectric layer 106, and the dielectric layer 114. In some embodiments, the contact 112 may be disposed in the dielectric layer 116. The dielectric layer 116 may be a single-layer structure or a multilayer structure. The material of the dielectric layer 116 is, for example, silicon oxide, silicon nitride, silicon carbonitride, silicon oxynitride, a low dielectric constant material, or a combination thereof.

In some embodiments, as shown in FIG. 3, the PUF generator structure 10 may include a PUF generator array PA. The PUF generator array PA may include a plurality of the PUF generators PF, a bit line BL1, a bit line BL2, a word line WL, a transistor T1, and a transistor T2.

The plurality of the PUF generators PF are arranged in an array. In some embodiments, the plurality of the PUF generators PF may be arranged in a direction D1 and a direction D2. The direction D1 may intersect the direction D2. In some embodiments, the direction D1 may be perpendicular to the direction D2, but the invention is not limited thereto.

The bit line BL1 is electrically connected to a plurality of the contacts 108. In some embodiments, the bit line BL1 may extend in the direction D1. In some embodiments, the bit line BL1 may be electrically connected to a plurality of the contacts 108 in a plurality of the PUF generators PF arranged in the direction D1.

The bit line BL2 is electrically connected to a plurality of the contacts 110. In some embodiments, the bit line BL2 may extend in the direction D1. In some embodiments, the bit line BL2 may be electrically connected to a plurality of the contacts 110 in a plurality of the PUF generators PF arranged in the direction D1.

The word line WL is electrically connected to a plurality of the contacts 112. In some embodiments, the word line WL may extend in the direction D1. In some embodiments, the word line WL may be electrically connected to a plurality of the contacts 112 in a plurality of the PUF generators PF arranged in the direction D1.

The transistor T1 is electrically connected between the contact 108 and the bit line BL1. That is, the contact 108 may be electrically connected to the bit line BL1 by the transistor T1. In some embodiments, the PUF generator array PA may include a plurality of the transistors T1, and two adjacent transistors T1 located between two adjacent PUF generators PF may share the same bit line BL1. For example, two adjacent transistors T1 located between the PUF generator PF1 and the PUF generator PF2 may share the same bit line BL1. In some embodiments, the transistor T1 may be a planar transistor, a fin field effect transistor (FinFET), or other suitable transistor.

The transistor T2 is electrically connected between the contact 110 and the bit line BL2. That is, the contact 110 may be electrically connected to the bit line BL2 by the transistor T2. In some embodiments, the PUF generator array PA may include a plurality of the transistors T2, and two adjacent transistor T2 located between two adjacent PUF generators PF may share the same bit line BL2. For example, two adjacent transistors T2 located between the PUF generator PF1 and the PUF generator PF3 may share the same bit line BL2. In some embodiments, the transistor T2 may be a planar transistor, a fin field effect transistor (FinFET), or other suitable transistor.

In some embodiments, the operation method of the PUF generator structure 10 includes performing an enrollment operation on the PUF generator PF to generate the dielectric breakdown at the random position of the dielectric layer 106. In some embodiments, the above-mentioned "random position" is usually located at the "weak point position" (i.e., the location on the dielectric layer 106 is prone to breakdown) of the dielectric layer 106. A conductive path can be formed at the breakdown position (e.g., the breakdown position BP in FIG. 1 and FIG. 3) of the dielectric layer 106 by the dielectric breakdown. The enrollment operation may include the following steps. A first voltage is applied to the contact 108, a second voltage is applied to the contact 110, and a third voltage is applied to the contact 112. The first voltage is equal to the second voltage, and the third voltage is greater than the first voltage and the second voltage.

For example, the enrollment operation performed on the PUF generator PF1 may include the following steps. A first voltage is applied to the bit line BL1, the transistor T11 is turned on, and the other transistors T1 are turned off, so as to apply the first voltage to the contact 108 of the PUF generator PF1. A second voltage is applied to the bit line BL2, the transistor T21 is turned on, and the other transistors T2 are turned off, so as to apply the second voltage to the contact 110 of the PUF generator PF1. A third voltage is applied to the word line WL to apply the third voltage to the contact 112 of the PUF generator PF1. The first voltage is equal to the second voltage, and the third voltage is greater than the first voltage and the second voltage.

By the above enrollment operation, the dielectric breakdown can be generated at the random position of the dielectric layer 106 of the PUF generator PF1 to generate a random code. In addition, a conductive path can be formed at the breakdown position BP of the dielectric layer 106 by the dielectric breakdown. In some embodiments, since the thickness TK2 of the edge portion P2 may be less than the thickness TK1 of the center portion P1, the breakdown position BP has a higher probability of being located at the edge portion P2, but the invention is not limited thereto. In other embodiments, the breakdown position BP may be located at the center portion P1. In the present embodiment, the breakdown position BP (i.e., the position of the conductive path) is closer to the contact 108, but the invention is not limited thereto. In other embodiments, the breakdown position BP (i.e., the position of the conductive path) may be closer to the contact 110.

In some embodiments, the operation method of the PUF generator structure 10 may further include performing an extraction operation on the PUF generator PF to read the data enrolled in the PUF generator PF. In some embodiments, when the extraction operation is performed on the selected PUF generator PF, if the current I1 read by the bit line BL1 is greater than the current I2 read by the bit line BL2, it may be regarded as enrolling a first data (e.g., data "1") in the PUF generator PF. In some embodiments, when the extraction operation is performed on the selected PUF generator PF, if the current I1 read by the bit line BL1 is less than the current I2 read by the bit line BL2, it may be regarded as enrolling a second data (e.g., data "0") in the PUF generator PF.

The extraction operation may include the following steps. A fourth voltage is applied to the contact 108, a fifth voltage is applied to the contact 110, and a sixth voltage is applied to the contact 112. The fourth voltage is equal to the fifth voltage, and the sixth voltage is greater than the fourth voltage and the fifth voltage. In some embodiments, the sixth voltage for the extraction operation may be less than the third voltage for the enrollment operation.

For example, the extraction operation performed on the PUF generator PF1 may include the following steps. A fourth voltage is applied to the bit line BL1, the transistor T11 is turned on, and the other transistors T1 are turned off, so as to apply the fourth voltage to the contact 108 of the PUF generator PF1. A fifth voltage is applied to the bit line BL2, the transistor T21 is turned on, and the other transistors T2 are turned off, so as to apply the fifth voltage to the contact 110 of the PUF generator PF1. A sixth voltage is applied to the word line WL to apply the sixth voltage to the contact 112 of the PUF generator PF1. The fourth voltage is equal to the fifth voltage, and the sixth voltage is greater than the fourth voltage and the fifth voltage.

By the above extraction operation, the data enrolled in the PUF generator PF1 can be read. In the present embodiment, since the breakdown position BP (i.e., the position of the conductive path) in the PUF generator PF1 is closer to the contact 108, when the extraction operation is performed, most of the current will flow to the bit line BL1 through the contact 108, and only a small portion of the current will flow to the bit line BL2 through the contact 110. In this way, the current I1 read by the bit line BL1 will be greater than the current I2 read by the bit line BL2, so it can be known that the data enrolled in the PUF generator PF1 is the first data (e.g., data "1").

In other embodiments, if the breakdown position BP (i.e., the position of the conductive path) in the PUF generator PF1 is closer to the contact 110, when the extraction operation is performed, most of the current will flow to the bit line BL2 through the contact 110, and only a small portion of the current will flow to the bit line BL1 through the contact 108. In this way, the current I1 read by the bit line BL1 will be less than the current I2 read by the bit line BL2, so it can be known that the data enrolled in the PUF generator PF1 is the second data (e.g., data "0").

Based on the above embodiments, in the PUF generator structure 10, the PUF generator PF includes the electrode layer 102, the electrode layer 104, the dielectric layer 106, the contact 108, the contact 110, and the contact 112. The dielectric layer 106 is disposed between the electrode layer 102 and the electrode layer 104. The contact 108 and the contact 110 are electrically connected to the electrode layer 102, and the contact 112 is electrically connected to the electrode layer 104. The contact 108, the contact 110, and the contact 112 can be used as three terminals of the PUF generator PF. Therefore, the PUF generator PF can have a smaller size, and the process of the PUF generator PF can be integrated with the process of the capacitor.

Furthermore, in the operation method of the PUF generator structure 10, the enrollment operation may include the following steps. The first voltage is applied to the contact 108, the second voltage is applied to the contact 110, and the third voltage is applied to the contact 112. The first voltage is equal to the second voltage, and the third voltage is greater than the first voltage and the second voltage. By the above enrollment operation, the dielectric breakdown can be generated at the random position of the dielectric layer 106 to generate a random code. Therefore, the operation method of the PUF generator structure 10 can generate a random code in a simple manner.

Figure 4:
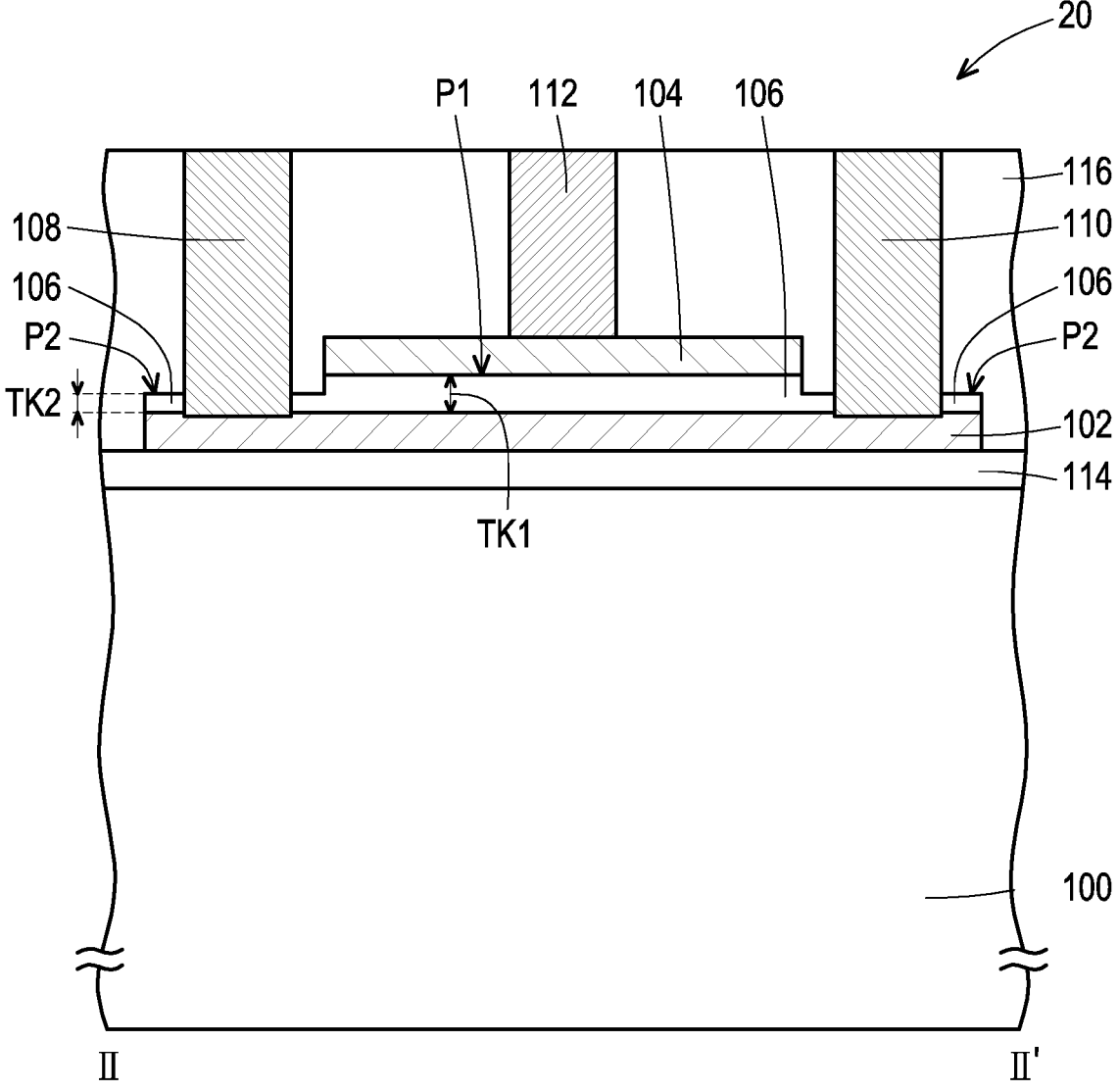
FIG. 4 is a cross-sectional view illustrating a PUF generator structure according to other embodiments of the invention.
Figure 5:
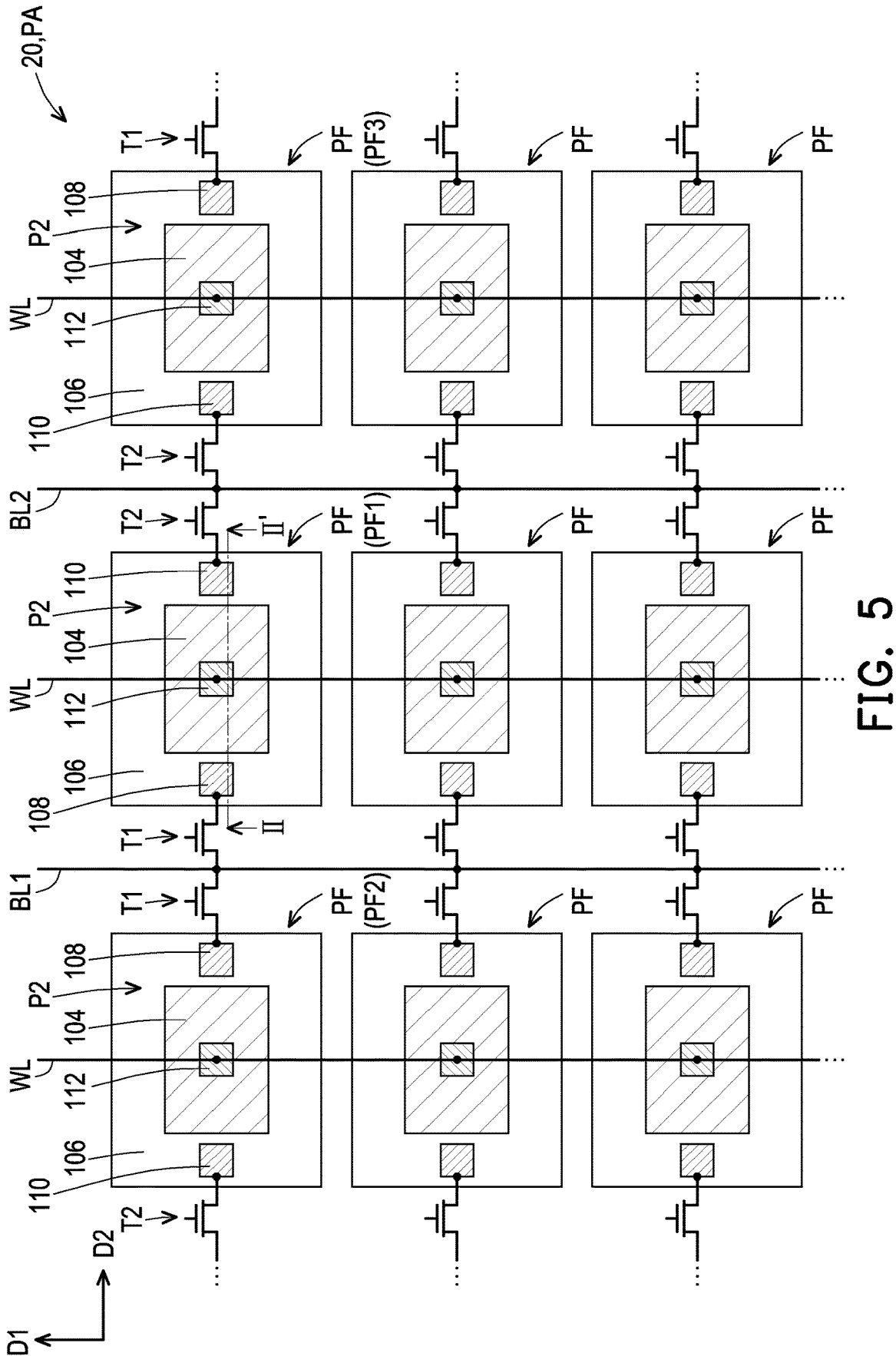
FIG. 5 is a schematic view illustrating a PUF generator array according to other embodiments of the invention.

FIG. 4 is a cross-sectional view illustrating a PUF generator structure according to other embodiments of the invention. FIG. 5 is a schematic view illustrating a PUF generator array according to other embodiments of the invention. In FIG. 5, the PUF generator is shown by the top view. FIG. 4 is a cross-sectional view taken along section line II-II' in FIG. 5. In the top view of the present embodiment, some components in the cross-sectional view are omitted to clearly illustrate the configuration relationship between the components in the top view. In the cross-sectional view of the present embodiment, some components in the top view are omitted to clearly illustrate the configuration relationship between the components in the cross-sectional view.

Referring to FIG. 1, FIG. 3, FIG. 4, and FIG. 5, the difference between a PUF generator structure 20 in FIG. 4 and FIG. 5 and the PUF generator structure 10 in FIG. 1 and FIG. 3 is as follows. In the PUF generator structure 20, the contact 108, the contact 110, and the contact 112 may be located on the same side of the dielectric layer 106. In the PUF generator structure 20, the contact 108 may pass through the edge portion P2 to be electrically connected to the electrode layer 102. In the PUF generator structure 20, the contact 110 may pass through the edge portion P2 to be electrically connected to the electrode layer 102. In the PUF generator structure 20, the contact 108, the contact 110 and the contact 112 may be disposed in the dielectric layer 116.

In addition, in the PUF generator structure 10 and the PUF generator structure 20, the same or similar components are denoted by the same reference symbols, and the description thereof is omitted here. Furthermore, the operation method of the PUF generator structure 20 may refer to the operation method of the PUF generator structure 10, and the description thereof is not repeated here.

Based on the above embodiments, in the PUF generator structure 20, the PUF generator PF includes the electrode layer 102, the electrode layer 104, the dielectric layer 106, the contact 108, the contact 110, and the contact 112. The dielectric layer 106 is disposed between the electrode layer 102 and the electrode layer 104. The contact 108 and the contact 110 are electrically connected to the electrode layer 102, and the contact 112 is electrically connected to the electrode layer 104. The contact 108, the contact 110, and the contact 112 can be used as three terminals of the PUF generator PF. Therefore, the PUF generator PF can have a smaller size, and the process of the PUF generator PF can be integrated with the process of the capacitor.

Furthermore, in the operation method of the PUF generator structure 20, the enrollment operation may include the following steps. The first voltage is applied to the contact 108, the second voltage is applied to the contact 110, and the third voltage is applied to the contact 112. The first voltage is equal to the second voltage, and the third voltage is greater than the first voltage and the second voltage. By the above enrollment operation, the dielectric breakdown can be generated at the random position of the dielectric layer 106 to generate a random code. Therefore, the operation method of the PUF generator structure 20 can generate a random code in a simple manner.

In summary, the PUF generator of the aforementioned embodiments can have a smaller size. In addition, the process of the PUF generator of the aforementioned embodiments can be integrated with the process of the capacitor. In addition, the operation method of the PUF generator structure of the aforementioned embodiments can generate a random code in a simple manner.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A physical unclonable function (PUF) generator structure, comprising:
   a substrate; and
   a PUF generator comprising:
     a first electrode layer disposed on the substrate;
     a second electrode layer disposed on the first electrode layer;
     a first dielectric layer disposed between the first electrode layer and the second electrode layer;
     a first contact and a second contact electrically connected to the first electrode layer and separated from each other, wherein in a cross-sectional view, the first contact and the second contact are symmetrically disposed on the first electrode layer; and
     a third contact electrically connected to the second electrode layer.

2. The PUF generator structure according to claim 1, wherein the first contact and the second contact are located on a same side of the first dielectric layer, the first contact and the third contact are located on different sides of the first dielectric layer, and the second contact and the third contact are located on different sides of the first dielectric layer.

3. The PUF generator structure according to claim 1, wherein the first contact, the second contact, and the third contact are located on a same side of the first dielectric layer.

4. The PUF generator structure according to claim 1, wherein the first dielectric layer has a plurality of thicknesses.

5. The PUF generator structure according to claim 1, wherein the first dielectric layer comprises:
   a center portion; and
   an edge portion located on two sides of the center portion, wherein a thickness of the edge portion is less than a thickness of the center portion.

6. The PUF generator structure according to claim 5, wherein a top-view pattern of the edge portion surrounds a top-view pattern of the center portion.

7. The PUF generator structure according to claim 5, wherein a top-view pattern of the edge portion overlaps a top-view pattern of the first contact and a top-view pattern of the second contact.

8. The PUF generator structure according to claim 5, wherein the first contact passes through the edge portion to be electrically connected to the first electrode layer, and the second contact passes through the edge portion to be electrically connected to the first electrode layer.

9. The PUF generator structure according to claim 1, wherein the first contact and the second contact are directly connected to the first electrode layer, and the third contact is directly connected to the second electrode layer.

10. The PUF generator structure according to claim 1, further comprising:
    a second dielectric layer disposed between the first electrode layer and the substrate; and
    a third dielectric layer disposed on the first electrode layer, the second electrode layer, the first dielectric layer, and the second dielectric layer.

11. The PUF generator structure according to claim 10, wherein the first contact and the second contact are disposed in the second dielectric layer, and the third contact is disposed in the third dielectric layer.

12. The PUF generator structure according to claim 10, wherein the first contact, the second contact, and the third contact are disposed in the third dielectric layer.

13. The PUF generator structure according to claim 1, comprising a PUF generator array, wherein the PUF generator array comprises:
    a plurality of the PUF generators arranged in an array;
    a first bit line electrically connected to a plurality of the first contacts;
    a second bit line electrically connected to a plurality of the second contacts;
    a word line electrically connected to a plurality of the third contacts;
    a first transistor electrically connected between the first contact and the first bit line; and
    a second transistor electrically connected between the second contact and the second bit line.

14. The PUF generator structure according to claim 13, wherein the plurality of the PUF generators are arranged in a first direction and a second direction, and the first direction intersects the second direction.

15. The PUF generator structure according to claim 13, wherein the PUF generator array comprises a plurality of the first transistors, and two adjacent first transistors located between two adjacent PUF generators share the same first bit line.

16. The PUF generator structure according to claim 13, wherein the PUF generator array comprises a plurality of the second transistors, and two adjacent second transistors located between two adjacent PUF generators share the same second bit line.

17. An operation method of the PUF generator structure according to claim 1, comprising:

performing an enrollment operation on the PUF generator, wherein the enrollment operation comprises:

applying a first voltage to the first contact;

applying a second voltage to the second contact; and applying a third voltage to the third contact, wherein the first voltage is equal to the second voltage, and the third voltage is greater than the first voltage and the second voltage.

18. The operation method of the PUF generator structure according to claim 17, further comprising:

performing an extraction operation on the PUF generator to read a data enrolled in the PUF generator, wherein the extraction operation comprises:

applying a fourth voltage to the first contact;

applying a fifth voltage to the second contact; and applying a sixth voltage to the third contact, wherein the fourth voltage is equal to the fifth voltage, and The sixth voltage is greater than the fourth voltage and the fifth voltage.

19. The operation method of the PUF generator structure according to claim 18, wherein the sixth voltage is less than the third voltage.

*    *    *    *    *